Nov. 18, 1924.  1,516,297
A. ISOM ET AL
SURGICAL INSTRUMENT
Filed Feb. 1, 1923
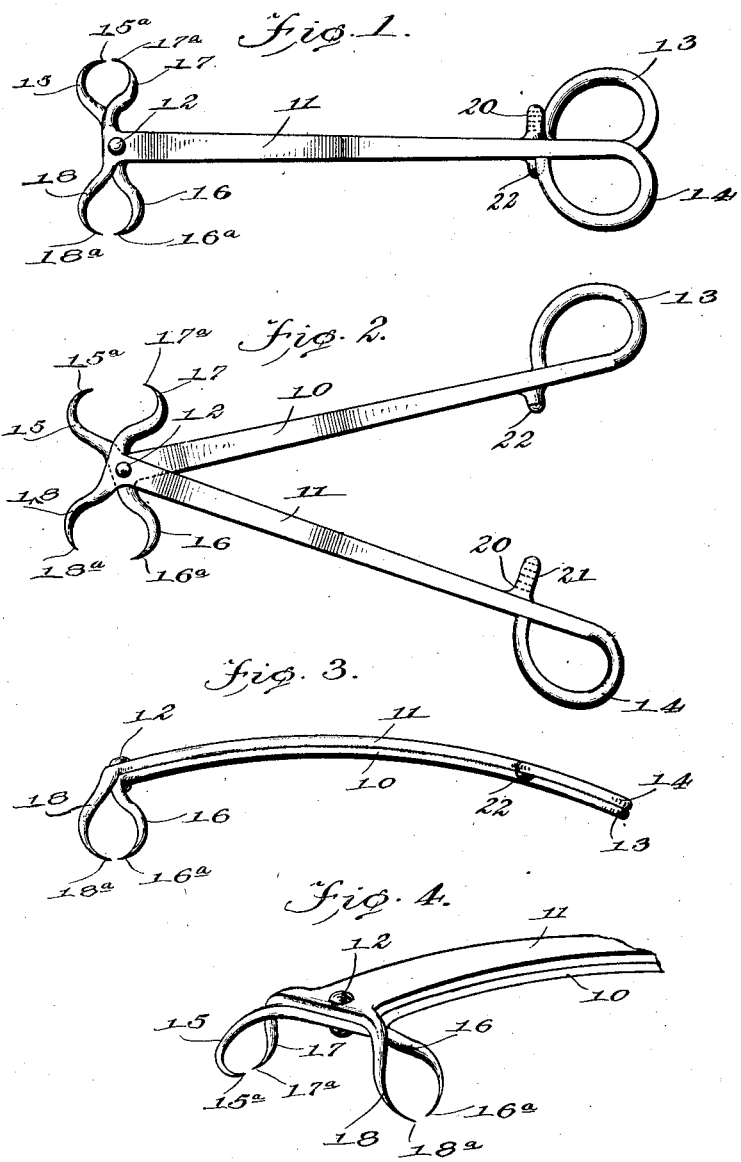
WITNESSES
INVENTOR
A. Isom
W. A. Bridwell
BY
ATTORNEYS Patented Nov. 18, 1924.

1,516,297

UNITED STATES PATENT OFFICE.

ALPHONSO ISOM AND WILLIAM A. BRIDWELL, OF DUMAS, ARKANSAS.

SURGICAL INSTRUMENT.

Application filed February 1, 1923. Serial No. 616,340.

*To all whom it may concern:*

Be it known that we, ALPHONSO ISOM and WILLIAM A. BRIDWELL, citizens of the United States, and residents of Dumas, in the county of Desha and State of Arkansas, have invented certain new and useful Improvements in Surgical Instruments, of which the following is a specification.

This invention relates to surgical instruments especially adapted for use as a towel clamp for abdominal incisions although of course it is to be understood that the instrument may be advantageously used in many other ways which will be apparent to those skilled in the art.

The object of the invention is to provide a surgical instrument of this character having means for positively and firmly securing the towels in position without interfering or being in the way of the operator and being at the same time readily manipulated and releasably held in adjusted position.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a plan view, showing the preferred embodiment of the invention with the hooks or jaws of the clamps in closed position;

Figure 2 is a view similar to Figure 1 but showing the hooks or jaws of the clamps in expanded position;

Figure 3 is a view in side elevation, the parts being positioned as shown in Figure 1; and Figure 4 is a fragmentary perspective view of the instrument.

Referring to the drawings the numerals 10 and 11 designate a pair of handle members pivotally connected at one end, as at 12, and formed or flat bars of metal curved longitudinally, as clearly shown in Figure 3, to conform to the contour of the body. At one end, the handle members 10 and 11 are formed with integral eyes 13 and 14 which facilitate manipulation of the instrument.

On the opposite end of the pivot 12 from the gripping eyes 13 and 14 the handle members 10 and 11 are each provided with two hooks. The hooks of the handle member 10 are designated at 15 and 16 and the hooks of the handle member 11 are designated at 17 and 18. The hooks 15 and 17 constitute a pair of clamp members and the hooks 17 and 18 also constitute a pair of clamp members. The hook 15 extends forwardly, downwardly and laterally to one side of the handle member 10 and it is formed with a rearwardly extending pointed bill 15ª. The hook 16 extends rearwardly, downwardly and laterally to the opposite side of the handle member 10 and is formed with a forwardly extending pointed bill 16ª. The hooks 17 and 18 are of similar construction though oppositely arranged with respect to the hooks 15 and 16 and thus the hook 17 extends rearwardly and laterally from the handle 11 but on the same side of the handle as the hook 15 lies, this hook 17 terminating at its outer end in a pointed and forwardly extending bill 17ª. Similarly the hook 18 extends forwardly and laterally of the handle member 11 but on the opposite side thereof from the hook 17 and consequently lies on the same side of the handle 10 as the hook 16, this hook 18 terminating in a pointed and rearwardly extending bill 18ª. The hooks 15 and 17 and 17 thus constitute the members of the clamp and the hooks 16 and 18 also constitute members of the clamp and the two clamps having a common operating means in the form of handles 10 and 11.

Means is provided for releasably locking the handle members in adjusted position whereby the clamping members are releasably held in adjusted position and preferably this means comprises a laterally extending lock arm 20 having a series of transverse locking slots 21 formed therein. This arm is preferably possessed of some resiliency and coacts with a locking lug 22 formed on the handle member 10. When the lock lug is engaged with any one of the series of slots 20 the handle members are held in position, but as these slots are shallow and as the handle members 10 and 11 as well as the arm 20 possesses some degree of resiliency the lug may be readily disengaged from the slot in which it is received to permit of adjustment although the engagement between the lug and slot is sufficiently positive to preclude accidental displacement.

In use as a towel clamp, the clamp members 15 and 17 serve to clamp the towel on one side of the incision and the hooks 17 and 18 serve to clamp it on the other side of the incision, the pointed bill of the hook penetrating the towel and gripping or bighting into the underlying portion of the flesh, preferably the flesh thus grasped lying immediately adjacent the incision.

It is to be understood that the invention is not restricted in its use as a towel clamp but may be used in many other ways that might suggest itself to surgeons and others skilled in the art. In any use to which the invention is put a double clamping action may be had and at the same time the handles which facilitate the manipulation of the instrument will in no way interfere with the operator, since the handles being flat and curved to correspond to the contour of the body lie flush up against the same.

We claim:

1. A surgical instrument comprising a pair of pivotally connected handles, each handle having at one end a rearwardly, laterally and downwardly extending hook terminating in a forwardly extending pointed bill, and having on its opposite side a laterally, forwardly and downwardly extending hook terminating in a rearwardly extending pointed bill, the hooks of one handle member being oppositely arranged with respect to the hooks of the other.

2. A surgical instrument comprising a pair of pivotally connected handles, one handle having at one end a rearwardly, laterally and downwardly extending hook terminating in a forwardly extending pointed bill, and having on its opposite side a laterally, forwardly and downwardly extending hook terminating in a rearwardly extending pointed bill, the other handle member having similar and oppositely arranged hooks, the hooks on each side of the handle members constituting clamps, said handles being formed of flat bars.

3. A surgical instrument comprising a pair of pivotally connected handles, one handle having at one end a rearwardly, laterally and downwardly extending hook terminating in a forwardly extending pointed bill and having on its opposite side a laterally, forwardly and downwardly extending hook terminating in a rearwardly extending pointed bill, the other handle member having similar and oppositely arranged hooks, the hooks on each side of the handle members constituting clamps, said handles being formed of flat bars, said bars being formed at their ends opposite the clamps with finger grips.

A. ISOM.
W. A. BRIDWELL.